US 8,184,430 B2
May 22, 2012

(12) United States Patent
Giffin et al.

(10) Patent No.: US 8,184,430 B2
(45) Date of Patent: May 22, 2012

(54) VEHICLE MEDIA SYSTEM

(75) Inventors: Michael Giffin, Stoney Brook, NY (US);
Bradley J. Plunkett, Oxnard, CA (US);
Mark Trainer, Northridge, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 1128 days.

(21) Appl. No.: 11/478,319

(22) Filed: Jun. 28, 2006

(65) Prior Publication Data
US 2007/0139878 A1 Jun. 21, 2007

Related U.S. Application Data

(60) Provisional application No. 60/695,279, filed on Jun. 29, 2005.

(51) Int. Cl.
*H05K 7/00* (2006.01)

(52) U.S. Cl. .................................. 361/679.01; 361/182

(58) Field of Classification Search .................... 381/86, 381/389; 345/400; 307/10.1; 455/402, 270, 455/277.1; 361/684, 139, 182, 600, 679.01; 320/136
See application file for complete search history.

(56) References Cited

U.S. PATENT DOCUMENTS

| | | | |
|---|---|---|---|
| 4,329,676 A * | 5/1982 | McDonald et al. | ........... 338/198 |
| 5,465,240 A * | 11/1995 | Mankovitz | ........................ 369/1 |
| 5,867,008 A * | 2/1999 | Du et al. | ....................... 320/136 |
| 5,970,390 A | 10/1999 | Koga et al. | |
| 6,272,328 B1 * | 8/2001 | Nguyen et al. | ............. 455/277.1 |
| 6,643,151 B1 * | 11/2003 | Nebrigic et al. | ................. 363/59 |
| 7,292,881 B2 * | 11/2007 | Seil et al. | .................... 455/575.1 |
| 2003/0122427 A1 * | 7/2003 | Yearwood et al. | ........... 307/10.1 |
| 2004/0151327 A1 * | 8/2004 | Marlow | .......................... 381/86 |
| 2004/0224638 A1 * | 11/2004 | Fadell et al. | ................. 455/66.1 |
| 2005/0001838 A1 * | 1/2005 | Gregorio et al. | ............. 345/440 |
| 2005/0018868 A1 * | 1/2005 | Chick et al. | .................... 381/349 |
| 2006/0277555 A1 * | 12/2006 | Howard et al. | ............... 720/600 |

FOREIGN PATENT DOCUMENTS

| | | |
|---|---|---|
| DE | 299 06 953 U1 | 4/2000 |
| JP | 2004-262354 | 9/2004 |
| WO | WO 00/69082 | 11/2000 |
| WO | 2004/097788 A | 11/2004 |

(Continued)

OTHER PUBLICATIONS

Apple & Mercedes-Benz Unveil iPod Integration Kit, MACWORLD Expo, San Francisco, Jan. 11, 2005 (http://www.apple.com/pr/library/2005/jan/11mercedes.html).*

(Continued)

*Primary Examiner* — Vivian Chin
*Assistant Examiner* — Friedrich W Fahnert
(74) *Attorney, Agent, or Firm* — Brinks Hofer Gilson & Lione

(57) ABSTRACT

A vehicle media system for use in conjunction with a portable media device is set forth. The vehicle media system includes an input module that is mountable, for example, at a console between the driver's seat and front passenger seat of the vehicle cabin, so that it may be manipulated by a user pursuant to input of system commands. A display module is mountable at a different location within the vehicle cabin, such as on the dashboard. A main module is connected to cooperate with the display module and the input module to facilitate user interaction with the portable media device.

20 Claims, 10 Drawing Sheets

FOREIGN PATENT DOCUMENTS

WO WO 2004/097788 A1 11/2004

OTHER PUBLICATIONS

"Power Supply Supervisory/Over and Undervoltage Protection Circuit MC3425", ON Semiconductor, Apr. 2001, Rev. 3. p. 1.*
Notification Concerning Transmittal of International Preliminary Report on Patentability (Chapter 1 of the Patent Cooperation Treaty), PCT/US2006/025306, dated Jan. 17, 2008, 12 pages.
XP001248191, DaimlerChrysler "1000 CDs im Handschuhfach" Hightech Report, vol. 1/2005, Jun. 15, 2005, 2 pages.
DaimlerChrysler: "1000 CDs im Handschuhfach," DaimlerChrysler Hightech Report, vol. 1/2005, Jun. 15, 2005, pp. 16-17, XP-001248191.
Communication from Canadian Intellectual Property Office for Canadian Application No. 2,612,057 dated Dec. 30, 2009.
Communication from European Patent Office for European Application No. 06 774 247.8 dated Aug. 7, 2009.
Notification of the First Office Action from the Chinese Patent Office for CN200680022699.5, dated Feb. 5, 2010, with translation.
Official Action for JP Pat. App. 2008-519548 dated Aug. 19. 2011, 2 pp.
Translation of Official Action for JP Pat. App. 2008-519548 dated Aug. 19. 2011, 3 pp.
Second Office Action for CN Pat. App. 2006800226995 dated Jan. 13, 2011, 11 pp.
Translation of Second Office Action for CN Pat. App. 2006800226995 dated Jan. 13, 2011, 14 pp.

* cited by examiner

VEHICLE MEDIA SYSTEM

PRIORITY CLAIM

This application claims the benefit of priority from U.S. Provisional Application No. 60/695,279, filed Jun. 29, 2005, which is incorporated herein by reference.

BACKGROUND OF THE INVENTION

1. Technical Field

The present invention is generally directed to a vehicle media system and, more particularly, to a vehicle media system that interfaces with a portable media device.

2. Related Art

Portable media devices have become increasingly popular over time. Many such devices are capable of storing substantial amounts of multimedia data for playback. The multimedia data is often purchased for download onto the portable media device and/or extracted from existing storage media, such as CDs, DVDs, or the like, for recording onto the device. As a result, users of such devices may carry extensive portions of their media collection with them wherever they go.

Playback of the media stored on the portable media device may be accomplished in various manners. When the device is carried on the person, headphones and/or a portable speaker system may be used for audio playback, while video playback may involve viewing the media on a device screen. When the media device is at a stationary location, such as an office or in the home, audio/video playback may take place, for example, over a home entertainment sound system. In each instance, the user may interact with the device through a device interface that is often unique to the particular media device. Through this device interface, the user may direct the portable media device to execute commands, such as play, pause, volume control, track selection, etc., by pressing buttons and manipulating other interface structures integrated with the portable media device. Visual feedback may be provided to the user on a display that likewise is integrated with the media device.

Vehicles, such as cars, trucks, or the like, often include sound systems that are used to playback AM/FM audio broadcasts, CD audio, etc. Higher end vehicles may be equipped with factory installed head units that interface with one or more types of portable media devices for playback of the stored content. However, such head units may require the user to learn a new device interface that substantially differs from the device interface used to operate the portable media device apart from the head unit. Further, the structures that are manipulated by the user to control the portable media device may be integrated into the head unit, which is typically mounted in the dashboard, thereby making it difficult for the user to access the structures. Accordingly, there is room for improving vehicle media systems that interact with portable media devices.

SUMMARY

A vehicle media system for use in conjunction with a portable media device is set forth. The vehicle media system includes an input module that is mountable, for example, at a console between the driver's seat and front passenger seat of the vehicle cabin, so that it may be manipulated by a user pursuant to input of system commands. A display module is mountable at a different location within the vehicle cabin, such as on the dashboard. A main module is connected to cooperate with the display module and the input module to facilitate user interaction with the portable media device. In one example, the portable media device includes a user interface that facilitates user interaction with the portable media device when the portable media device operates apart from the vehicle media system. In such instances, the main module may cooperate with the input module and the display module to generally mimic the user interface of the portable media device when the portable media device is operated in conjunction with the vehicle media system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
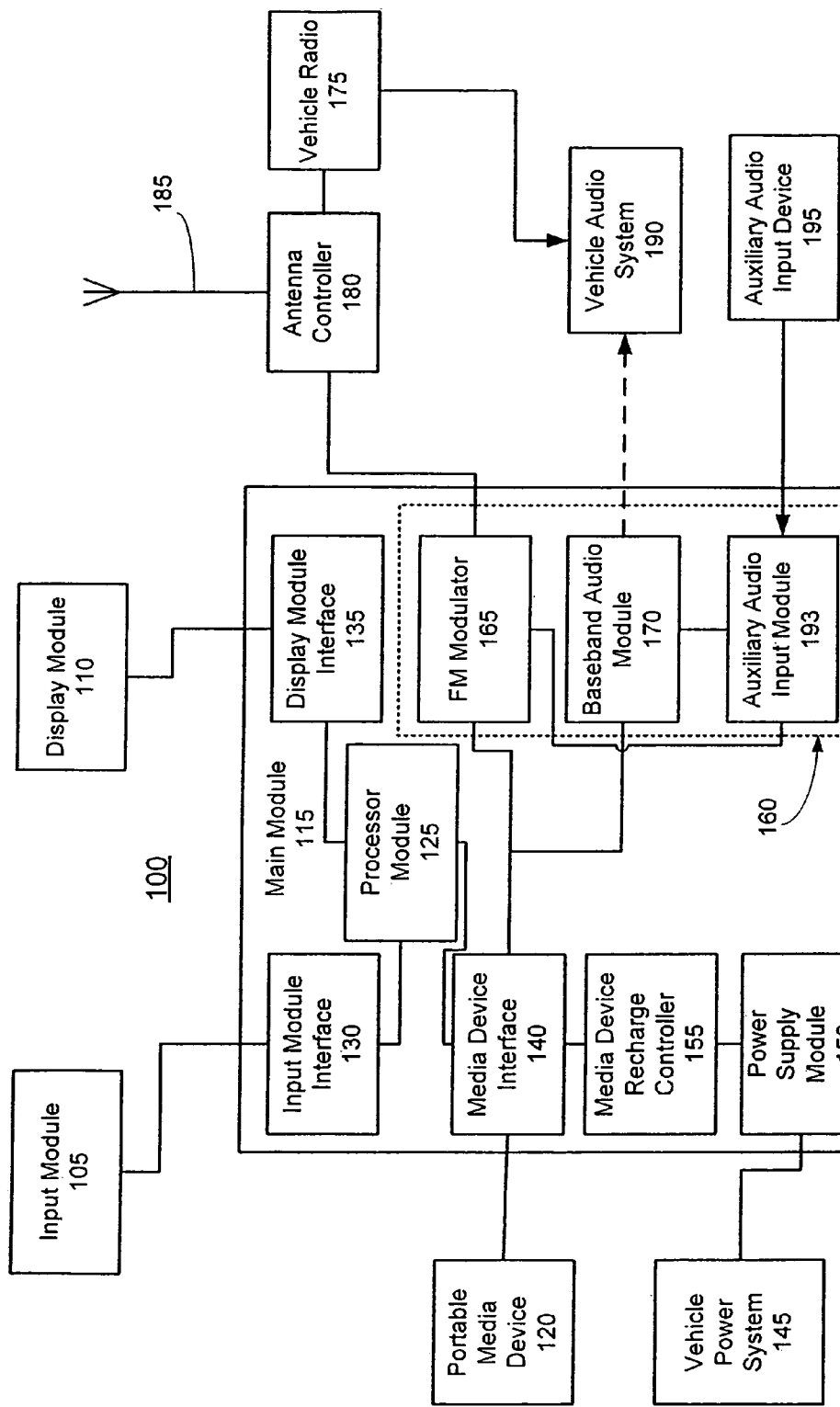
FIG. 1 is a block diagram of one example of a vehicle media system that interacts with a portable media device.

FIG. 1 is a block diagram of one example of a vehicle media system that may be used to interact with a portable media device. In this example, the system 100 includes an input module 105, a display module 10, and a main module 115. The input module 105 is mountable at a first location within the vehicle cabin for manipulation by a user pursuant to the input of system commands. The display module 110 is mountable at a second location within the vehicle cabin. For example, the input module 105 may be mounted on a console between the driver's seat and the front passenger seat of the vehicle, while the display module 110 may be mounted in or on the dashboard of the vehicle. This allows the user to manipulate the input module 105 and observe the display module 110 with a minimal amount of distraction. Although the interconnections between the various modules 105, 110, and 115 will be shown below as wired connections, such connections may be replaced by one or more wireless connections, such as infrared connections, Bluetooth connections, etc.

The main module 115 cooperates with the display module 110 and input module 105 to facilitate user interaction with a portable media device 120. The portable media device 120 may include a user interface that facilitates user interaction with the portable media device 120 when the device operates apart from the vehicle media system 100. The main module 115 may cooperate with the input module 105 and the display module 110 to generally mimic the standard user interface of the portable media device 120 when the device is operated in conjunction with the vehicle media system 100.

The portable media device 120 may be any audio device, video device, still picture device, or any combination of the above. For example, device 120 may be in the form of an Apple® IPod® device, or the like. Alternatively, or in addition, the media device 120 may include a cellular telephone with a built-in media file player. Although FIG. 1 shows a single media device 120 interfaced with the main module 115, system 100 may be implemented to interact with multiple media devices of the same type or different types.

Main module 115 may include a variety of different functional modules that are implemented in hardware, software, or a combination of both. As shown, main module 115 may include a processor module 125 that, for example, monitors and controls the operation of other modules in main module 115. The modules may include an input module interface 130 that is disposed to receive signals indicative of manipulation of the input module by user and a display module interface 135 disposed to provide signals to operate the display module 110. Signals received by the processor module 125 through the input module interface 130 may be used to control operations of the portable media device 120 through the media device interface 140. Visual information, such as selection menus, media information (type of media, artist information, song information, video information, or the like), etc., may be provided to the user on display module 110 in response to signals sent from the processor module 125 to the display module interface 135. If desired, the manner in which the main module 115 responds to manipulation of the input module 105, controls portable media device 120, and provides visual information to the user on display module 110 may be structured to generally mimic the user interface of the portable media device 120.

Electrical power for operating system 100 may be provided from the vehicle power system 145. The vehicle power system 145 may include the vehicle's main battery, an alternator, or other sources of power associated with the vehicle. To this end, power from system 145 may be provided to one or more power supply modules 150 in system 100. In the example shown in FIG. 1, a single power supply module 150 is provided in main module 115, which, in turn, distributes power to input module 105 and display module 110 through the input module interface 130 and display module interface 135, respectively. As an alternative, input module 105 and display module 110 may have their own respective power supplies for connection to the vehicle power system 145. Various other manners of providing power to system 100 also may be employed.

Power supply 150 may be connected to provide power to the input of a media device recharge controller module 155. The media device recharge controller 155 provides power to portable media device 120 through media device interface 140 at a level to ensure proper recharge of the device 120. A separate recharge controller 155, however, need not be employed. Rather, power supply module 150 may be constructed to provide recharge power to the device 120 through the media device interface 140.

Main module 115 also may include audio circuitry 160 that receives signals corresponding to audio content stored in the portable media device 120. System 100 provides such signals to the audio circuitry 160 through the media device interface 140. The signals provided to the audio circuitry 160 may be analog signals, digital signals, or a combination of both.

In the exemplary system shown in FIG. 1, the audio circuitry includes an FM modulator 165 and a baseband audio module 170. The FM modulator 165 converts the signals received through the media device interface 140 to a format for reception by an FM broadcast radio. For example, an FM signal that has been modulated by an audio signal corresponding to signals received through media device interface 140 may be provided over the air or through a wired connection for reception by the vehicle's radio 175. FIG. 1 shows the output of FM modulator 165 connected to the vehicle radio 175 over a wired connection through an optional antenna controller 180. Antenna controller 180 may be employed to selectively provide an RF signal to the vehicle radio 175 from either modulator 165 or antenna 185. Alternatively, antenna controller 180 may be constructed to concurrently provide RF signals from both the modulator 165 and antenna 185 to the vehicle radio 175. The signal provided from FM modulator 165 is demodulated in vehicle radio 175 and provided as audio to the vehicle's audio system 190, where the audio content can be heard by the individuals in the vehicle cabin.

System 100 may include a baseband audio module 170 that, for example, is specifically designed to interface with vehicle audio system 190. For example, the baseband audio module 170 may be specifically adapted to interface with a factory installed head unit. The provision of the FM modulator 165 and/or baseband audio module allows system 100 to be installed as an aftermarket product.

Audio circuitry 160 also may include an auxiliary audio input module 193. The auxiliary audio input module 193 may interface with analog and/or digital audio provided by an auxiliary audio input device 195. Exemplary audio input devices include satellite radio receivers, CD players, other portable media devices, or the like. Auxiliary audio input module 193 may provide signals corresponding to the analog and/or digital audio provided by device 195 to the input of the FM modulator 165 and/or baseband audio unit 170.

Figure 2:
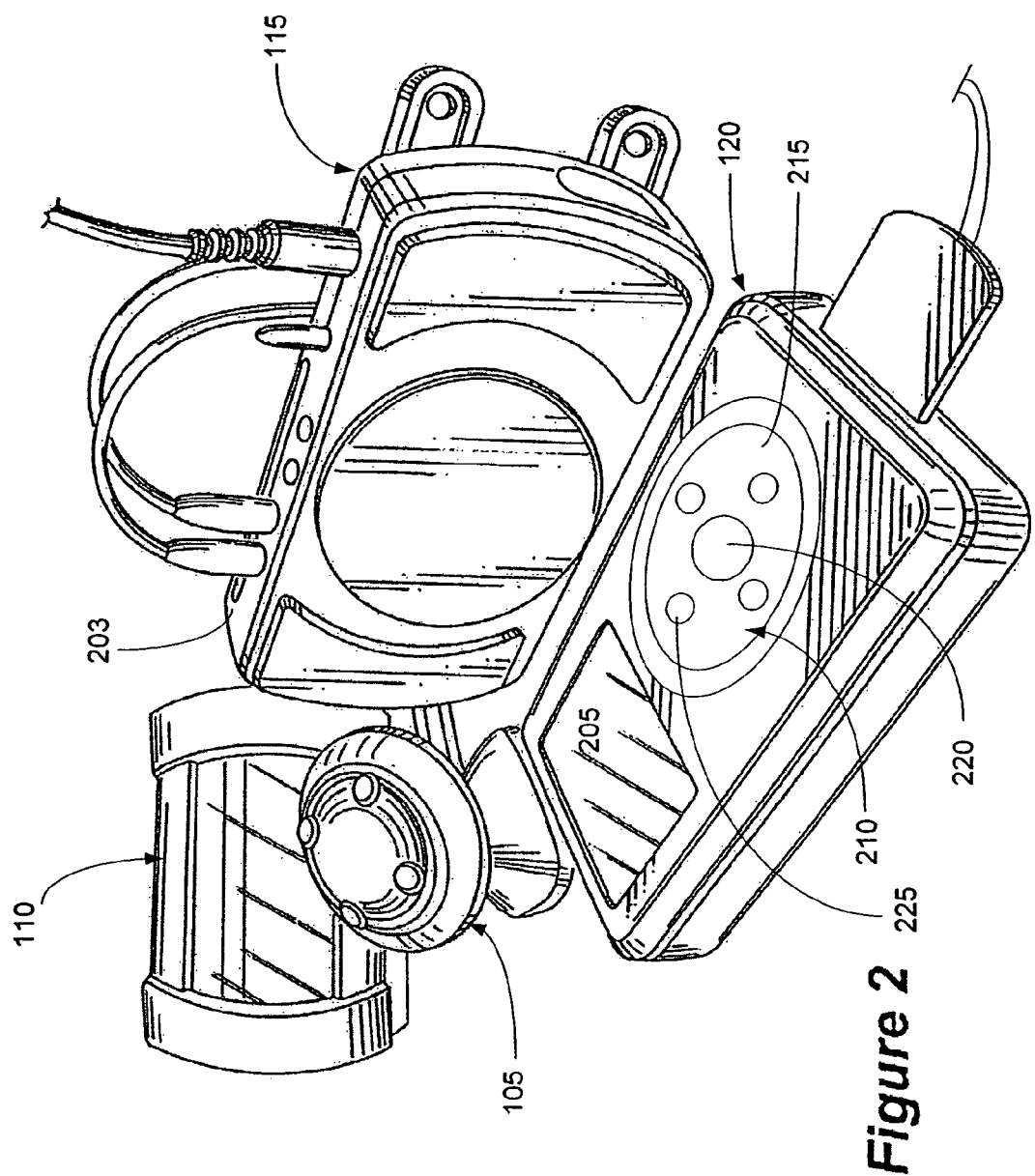
FIG. 2 is a perspective view showing exemplary mechanical constructions for the various components used in the system shown in FIG. 1.

FIG. 2 illustrates one manner in which the components of system 100 may be mechanically constructed. In FIG. 2, the system 100 includes the input module 105, the display module 110, and the main module 115. The input module 105 and the display module 110 include wired connections that connect to corresponding adapters disposed at a connection end 203 of the main module 115.

FIG. 2 shows the system 100 interfacing with a portable media device 120, such as an Apple® iPod®. When constructed in this manner, media device 120 includes a display 205 and a control interface 210 that cooperate with one another to implement the overall device interface. Control interface 210 may include a rotary wheel surface 215, a centrally disposed select button 220, and a number of radially disposed control buttons 225. Media device 120 likewise connects through wires to one or more corresponding adapters disposed at connection and 203 of main module 115.

Figure 3:
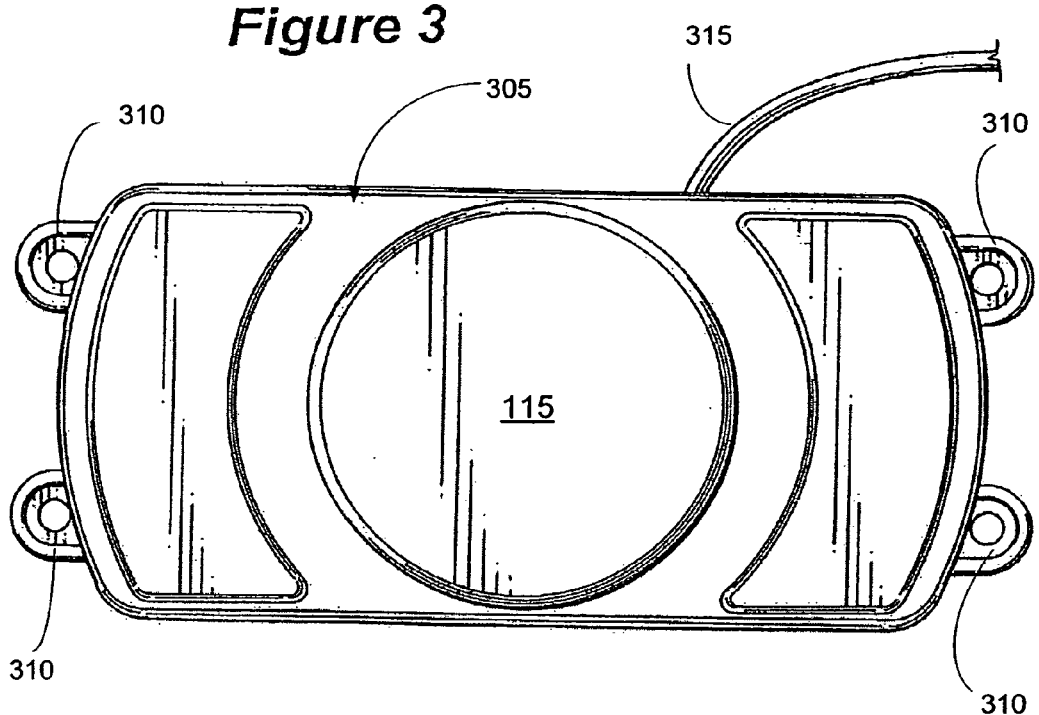
FIG. 3 is a plan view of the main module shown in FIG. 2.

FIG. 3 is a plan view of the main module 115 shown in FIG. 2. As illustrated, the main module 115 includes a housing 305 that substantially encloses the electronics of the main module 115 shown in FIG. 1. A plurality of tabs 310 extend from the periphery of the housing 305 to facilitate mounting of the main module 115 within the vehicle. Main module 115 may be mounted at a location within the vehicle that is different from the locations at which the display module 110 and input module 105 are mounted. For example, main module 115 may be mounted beneath the dashboard or in the glove compartment of the vehicle. A power cable 315 may extend from the housing 305 for connection to the vehicle power system 145.

Figure 4:
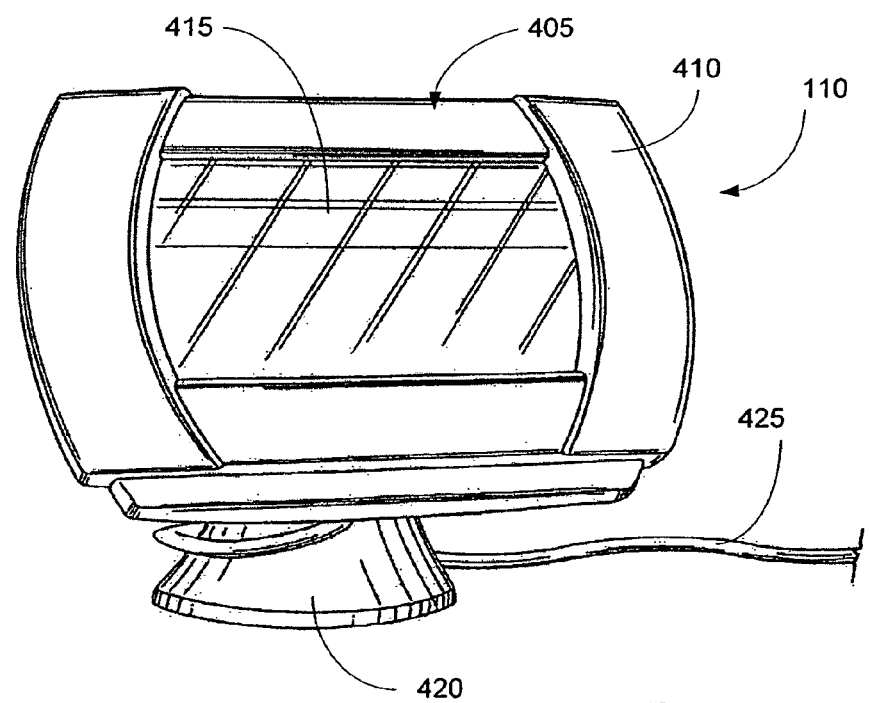
FIG. 4 is a perspective view of the display module shown in FIG. 2.

FIG. 4 is a perspective view of the display module 110 shown in FIG. 2. As illustrated, display module 110 includes a housing 405 having a front portion with an opening defined by a bezel 410. Bezel 410 is disposed about the periphery of an electronic display 415. A mounting stem 420 extends from housing 405 to facilitate mounting of the display module 110 within the vehicle cabin. A cable 425 proceeds from the housing for connection to the appropriate adapter on the main module 115.

Figure 5:
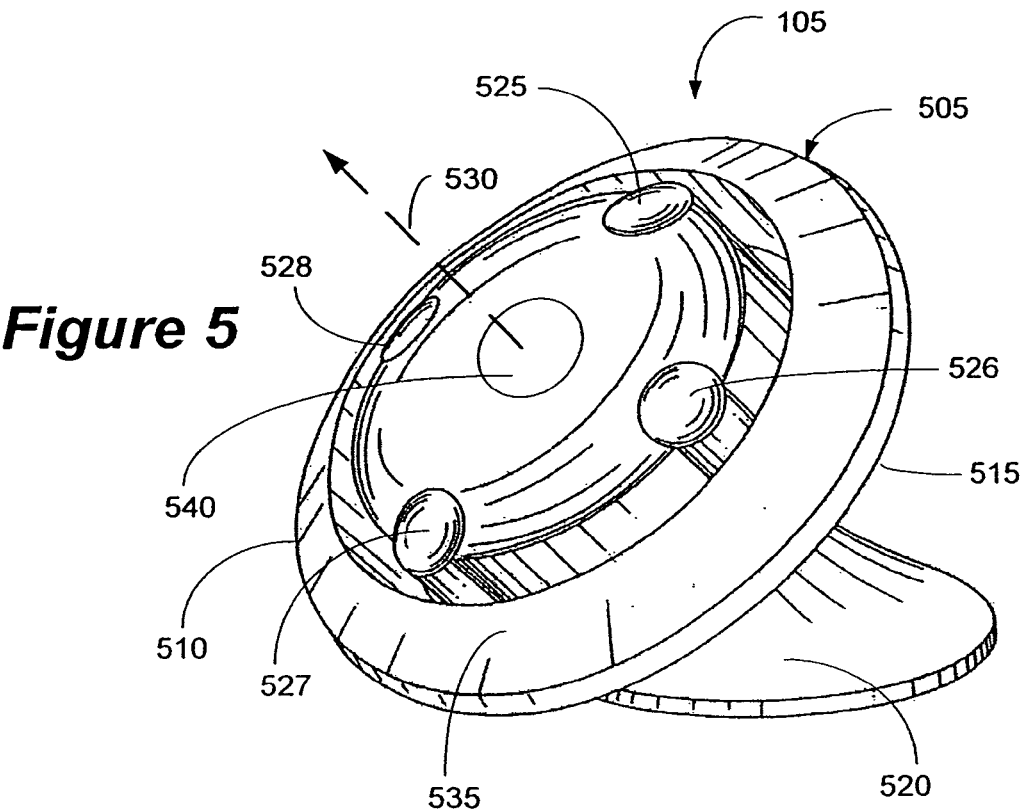
FIGS. 5 and 6 are perspective and plan views, respectively, of the input module shown in FIG. 2.

FIG. 5 is a perspective view of the input module 105 shown in FIG. 2. As illustrated, the input module 105 is in the form of a generally circular housing 505 having a face portion 510 and a rear portion 515. A mounting stem 520 extends from the rear portion 515 of the housing 505 to facilitate mounting of the input module 105 in the vehicle cabin.

The input module 105 includes a number of components that allow a user to interact with system 100. In the illustrated example, the input module 105 may be used to generally mimic the command interface 210 of the portable media device 120. To this end, a plurality of user selectable buttons 525, 526, 527, and 528, are disposed radially about a first axis 530 of the generally circular housing 505. Buttons 525, 526, 527, and 528, may be disposed at locations that generally correspond to the control buttons 225 of control interface 210. A potentiometer control 535 also may be provided. Potentiometer control 535 may be disposed for rotational movement about an axis of the housing 505, such as axis 530, although other relative orientations for the potentiometer control 535 may be employed. The potentiometer control 535 may be used to generally mimic the operation of the rotary wheel surface 215 of control interface 210. A central select button 540 may be disposed proximate a central area of the front portion 510 and, for example, may be used to generally mimic the operation of select button 220 of control interface 210.

Figure 6:
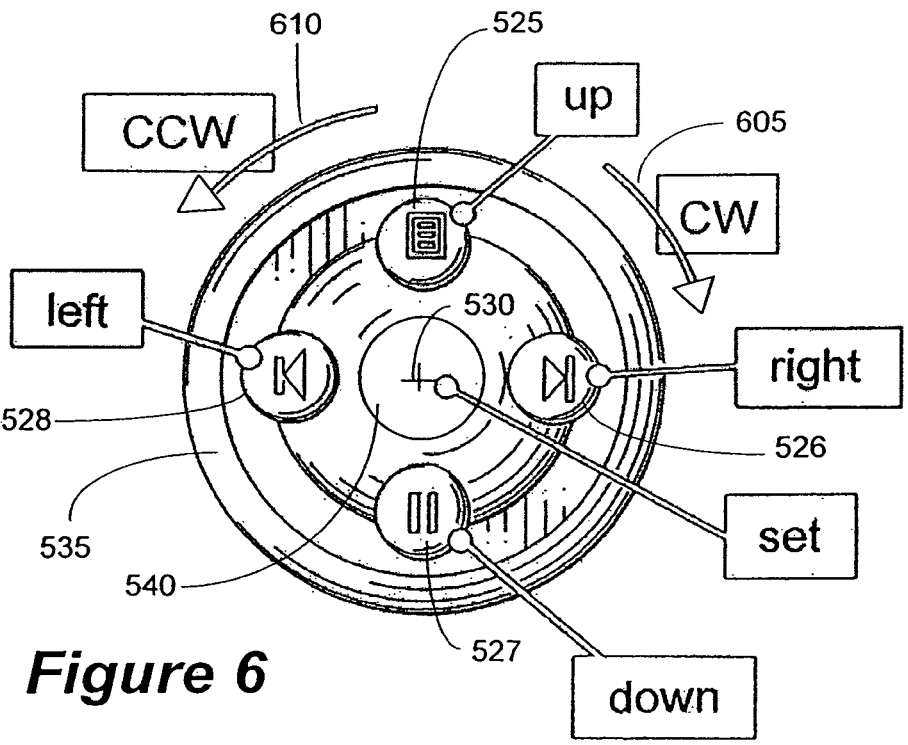

FIG. 6 is a plan view of the input module 105 shown in FIG. 5, where visual indicia indicative of the operation of the buttons 525, 526, 527, and 528, are printed on each button. In this example, button 525 has visual indicia indicative of a menu display printed on it. Button 526 has visual indicia indicating that it may be used to move forward in a track selection process, while button 528 has visual indicia indicating that it may be used to move backward in a track selection process. Button 527 has visual indicia indicating that it may be used to pause playing of the currently selected media. The visual indicia on each of the buttons 525, 526, 527, and 528, may be used, for example, to indicate the primary function of each of the buttons. However, secondary and tertiary functions also may be assigned to each button operation. Such secondary operations are noted in the callouts of FIG. 6. In one example, the input module interface 130 may be responsive to interrupts that are generated when the buttons are pressed. Which button has been pressed may be determined by checking the buttons upon occurrence of the interrupt and storing data corresponding to the interrupt for handling by the input module interface 130. Polling of the buttons also may be employed. Processor module 125 may control the operation of the portable media device 120 and display module 110 through the media device interface 140 and display module interface 135, respectively, in response to manipulation of the buttons.

Potentiometer control 535 may be rotated about axis 530 in either a clockwise direction 605 or counterclockwise direction 610. The rotation of the potentiometer control 535 may be continuous in each direction. Alternatively, the potentiometer control 535 may have limited rotational motion in each direction. In either instance, the main module 115 may treat the movement of the potentiometer control 535 in a manner that generally mimics the operation of rotary wheel surface 215. For example, the output of the potentiometer control 535 may be provided to the input of an analog-to-digital converter associated with the input module interface 130, where the digital value corresponds to the position of the potentiometer control 535 and the rate of change of the digital value indicates how quickly the user rotates the control 535. Processor module 125 may control the operation of the portable media device 120 and display module 110 through the media device interface 140 and display module interface 135, respectively, in response to manipulation of the potentiometer control 535.

The media device recharge controller 155 shown in FIG. 1 may control any functionality associated with recharging the media device 120. Examples of this functionality may include, but are not limited to, protecting the vehicle power system 145 from excessive drainage by the media player 120, and protecting the media player 120 from spikes and other abnormalities in the power provided by the vehicle power system 145.

In operation, the vehicle power system 145, such as the vehicle's battery, may require protection from excessive power drainage. For example, if the vehicle is not operated for an extended period of time, the media device 120 may present a significant drain on the battery that makes it difficult or impossible to subsequently start the vehicle. The media device recharge controller 155 may be used to reduce or eliminate the excessive draining of the vehicle's battery by the media device 120.

Charging of a media device in the vehicle may be monitored to prevent excessive battery drain. For example, if the voltage level of the vehicle battery falls below a predetermined threshold value, the amount of power drawn by the media device from the vehicle battery may be reduced or eliminated. When eliminating the power draw by the media device, the media device may be effectively disconnected from the battery to prevent further device charging and battery drain.

Figure 7:
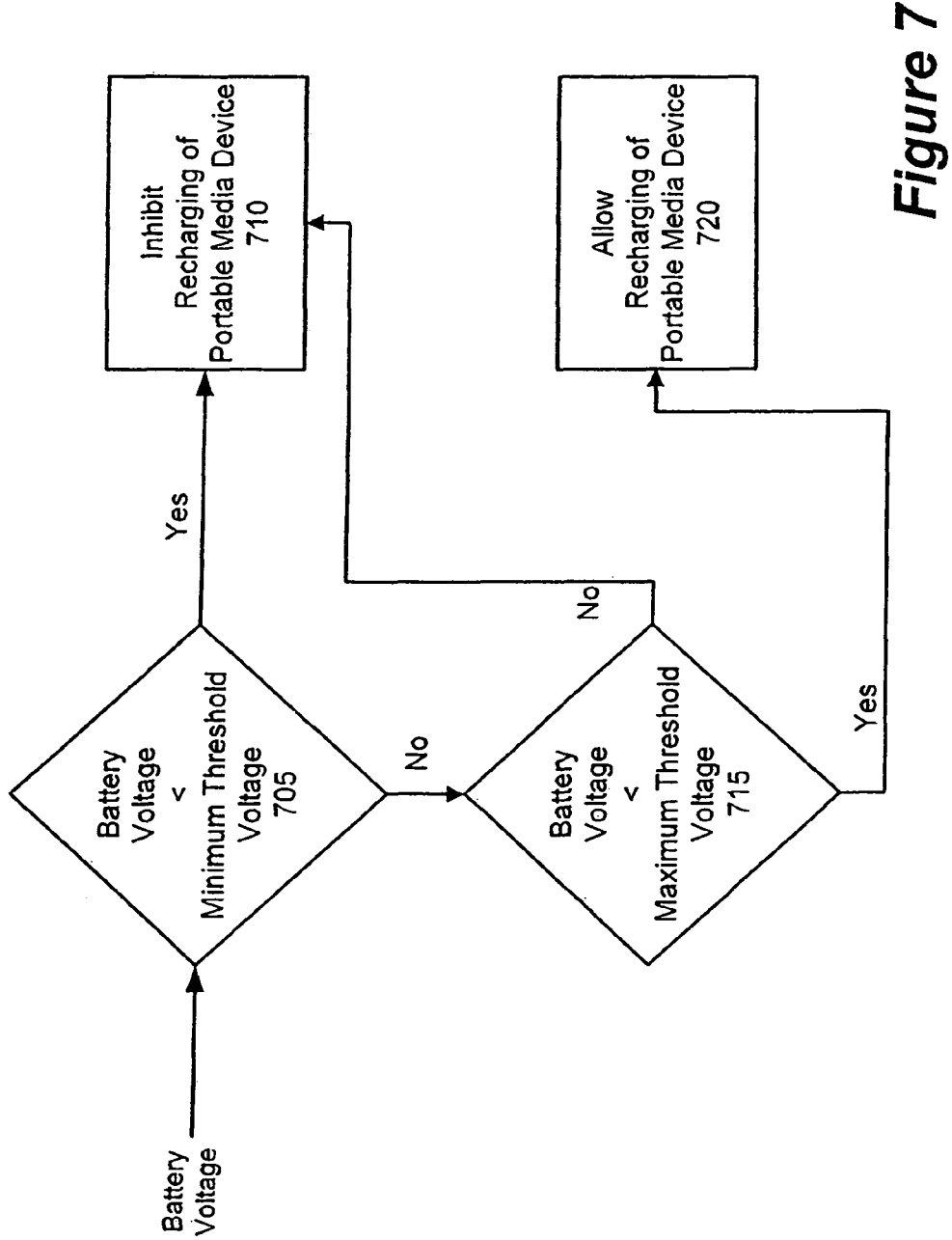
FIG. 7 is a flow chart illustrating various operations that may be executed by the media device recharge controller shown in FIG. 1.

A flow chart illustrating various operations that may be executed by the media device recharge controller 155 to prevent excessive battery discharge by the media device 120 is provided in FIG. 7. As shown, the battery voltage is detected at block 705 and compared to a minimum threshold voltage. If the battery voltage is less than the minimum threshold voltage, it is assumed that the vehicle battery is in a discharged state and cannot sustain charging the portable media device 120. Accordingly, the media device recharge controller 155 operates to inhibit recharging of the portable media device 120 from the battery at block 710. However, if the battery voltage is above the minimum threshold voltage, it is assumed that the vehicle battery is in a state having sufficient power to recharge device 120. Nevertheless, there may be spikes or aberrations in the vehicle power system that could possibly damage the media device 120. Consequently, the voltage is compared at block 715 to a maximum threshold voltage. If the battery voltage exceeds the maximum threshold voltage, it is assumed that the media device 120 may be damaged by the power from the vehicle power system. In such situations, recharging of the portable media device 120 is again inhibited at block 710. However, if the battery voltage is below the maximum threshold voltage at block 715, the media device recharge controller 155 may allow recharging of the portable media device 120 at block 720. When using two different thresholds (a minimum threshold to reduce or remove power to the media device and a maximum threshold below which power is connected to or increased to the media device), the system may employ built-in hysteresis so that the second threshold value is greater than the first threshold value. The monitoring of the battery voltage that takes place in the operations shown at blocks 705 and 715 may be executed multiple times whenever an attempt is made to recharge the portable media device 120.

Figure 8:
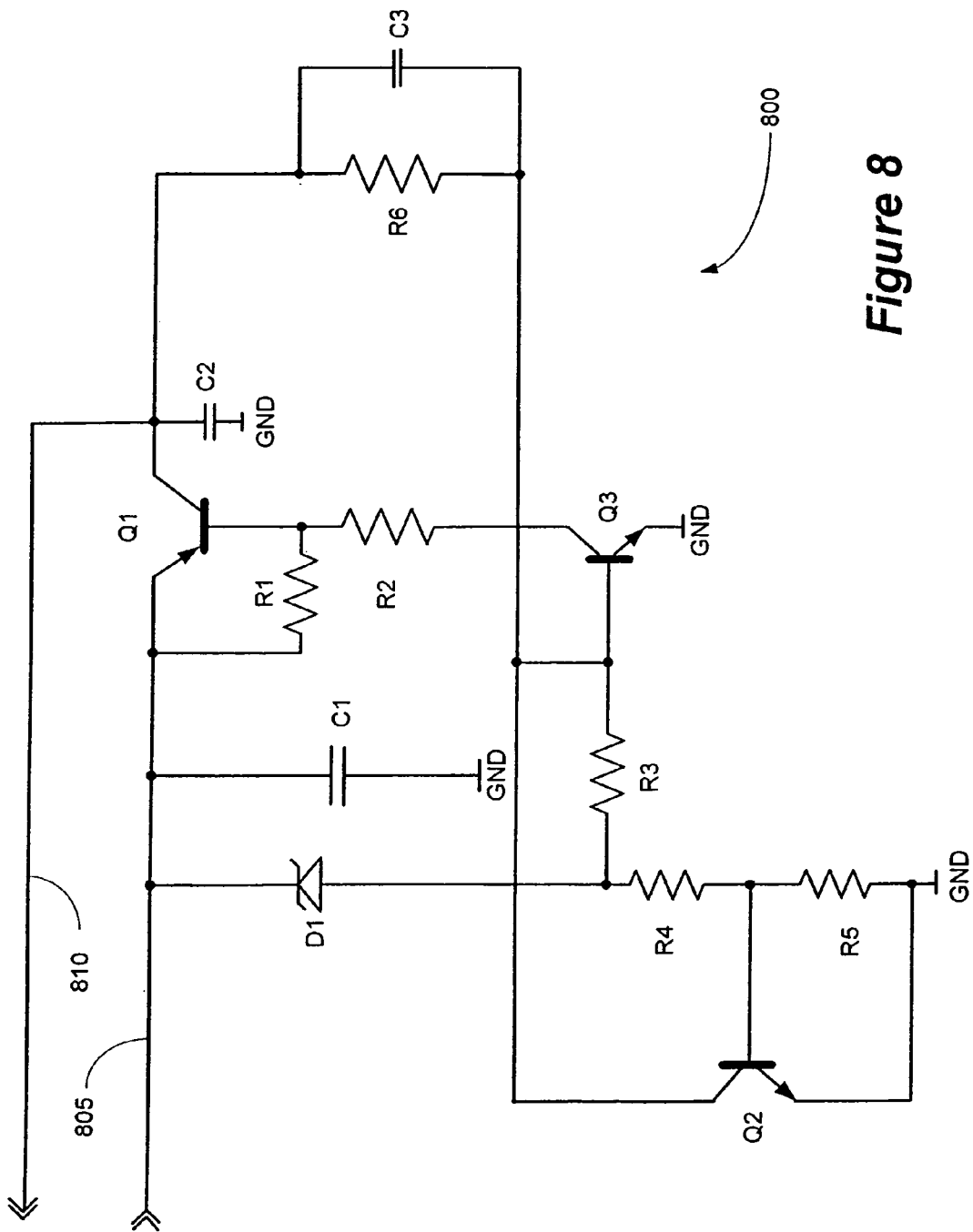
FIG. 8 is a schematic diagram of a recharge control circuit that may be used in the media device recharge controller to execute the operations shown in FIG. 7.

FIG. 8 is a schematic diagram of a recharge control circuit 800 that may be used in the media device recharge controller 155 to execute the operations shown in FIG. 7. In this example, power from the vehicle power system 145 is provided at line 805, while power for use in recharging the media device 120 is provided at line 810. In operation, if the voltage at line 805 exceeds the minimum threshold voltage but is below the maximum threshold voltage, Zener diode D1 goes to a conductive state and assists in absorbing any voltage spikes that may occur. At the same time, transistor Q2 is in an open state while transistors Q1 and Q3 are in conductive states thereby through-connecting the power provided at line 805 to line 810.

If the voltage at line 805 is below the minimum threshold voltage, Zener diode D1 goes to a non-conductive state. At the same time, transistors Q1, Q2, and Q3 are in an open state thereby disconnecting the power provided at line 805 from line 810.

If the voltage at line 805 exceeds the maximum threshold voltage, Zener diode D1 goes to a conductive state. At the same time, transistor Q2 goes to a conductive state thereby driving transistors Q3 and Q1 to nonconductive states and, further, effectively connecting line 810 through resistor R6 to ground. Transition between these various states includes hysteresis based on the value of the various electronic components of circuit 800. Exemplary values for the components are set forth in Table 1.

TABLE 1

| Component Reference | Component Value |
|---|---|
| C1 | 10 uF electrolytic |
| C2 | 1 uF electrolytic |
| C3 | 100 pF |
| D1 | BZX84C11-7 11 volt Zener diode |
| Q1 | PZT2907A transistor |
| Q2, Q3 | 2SC2712 transistor |
| R1 | 470 ohms |
| R2 | 333 ohms |
| R3, R4 | 1K ohms |
| R5 | 82 ohms |
| R6 | 33K ohms |

As noted above in connection with FIG. 1, FM modulator 165 may be connected to provide audio from the portable media device 120 via short range transmissions, such as radio-frequency (RF) transmissions that are received and played through the FM receiver of the vehicle radio 175. In order to prevent fading and cross-modulation of the signal, a direct coupling between the RF antenna input of the car radio and the short range signal generator may be provided. However, this direct coupling may lead to unwanted and sometimes prohibited re-transmission of the short range signal through the existing car radio antenna 185. The antenna controller 180 may provide the direct coupling while reducing or eliminating the re-transmission of the short range signal.

Figure 9:
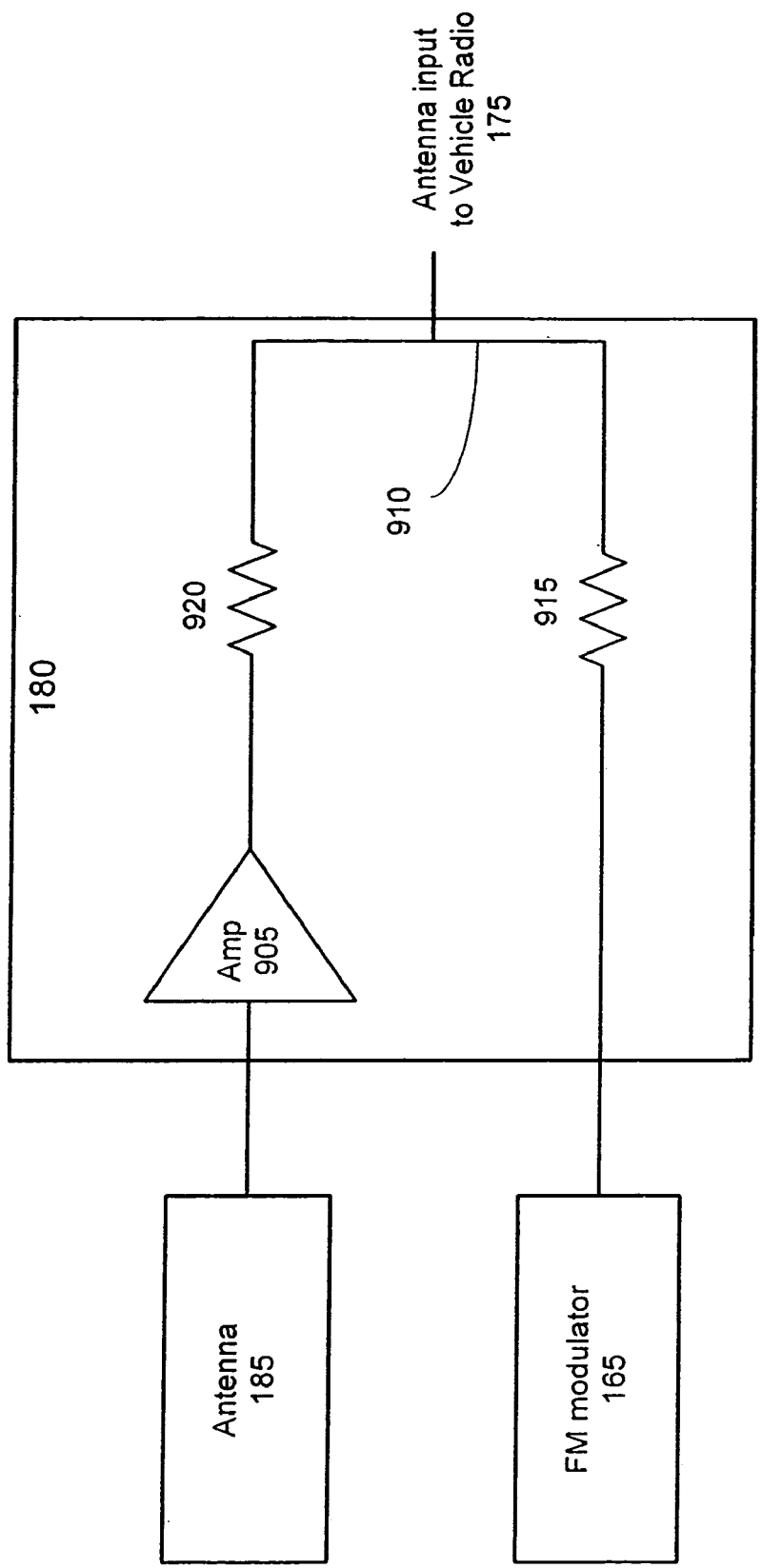
FIG. 9 is a block diagram of one construction of the antenna controller shown in FIG. 1.

Antenna controller 180 may be implemented in a variety of different manners. One example of an antenna controller design is illustrated in FIG. 9. In this example, the antenna 185 is connected to the input of an isolation amplifier 905. The output of FM modulator 165 is connected to node 910 through a resistor 915, while the output of isolation amplifier 905 is connected to node 910 through resistor 920. Further, the value of resistor 915 may be selected so that is greater than the value of the resistor 920.

In operation, isolation amplifier 905 reduces the signal strength of the signal provided by FM modulator 165 to thereby prevent retransmission of the modulated signal by antenna 185. Only one isolation amplifier is shown since the output from FM modulator 165 may already be amplified. Thus, the signals from the antenna 185 and FM modulator 165 may be directly coupled in the illustrated manner while reducing the re-transmission of signals transmitted by the FM modulator 165. Further isolation is obtained through the proper selection of the values for resistors 915 and 920.

Figure 10:
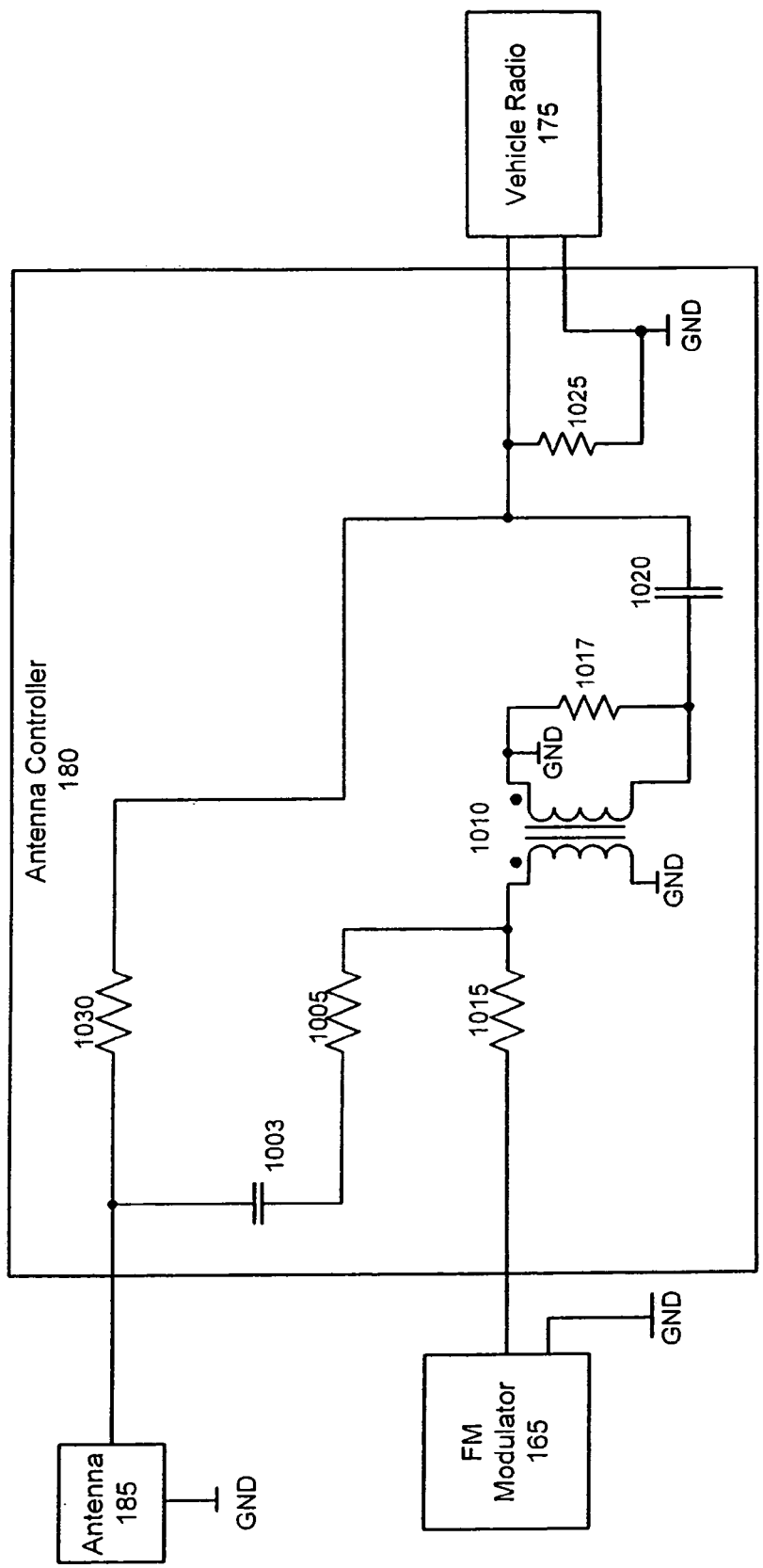
FIG. 10 is a schematic diagram of a further construction of the antenna controller shown in FIG. 1.

FIG. 10 is a schematic diagram of a passive circuit that may be used in antenna controller 180 for directly coupling the antenna 185 and FM modulator 165 to the vehicle radio 175 while concurrently limiting retransmission of the signal from the FM modulator 165 by antenna 185. In this exemplary circuit, the high-frequency components of the signals from the antenna 185 are directly coupled through capacitor 1003 to resistor 1005. The received signals are provided through resistor 1005 to the primary windings of a transformer 1010. Similarly, the output signals from FM modulator 165 are provided to the primary windings of the transformer 1010 through resistor 1015. Transformer 1010 may have a primary to secondary winding ratio of about 1:4. A load resistance 1017 is connected across the secondary windings of transformer 1010 and the output of transformer 1010 is coupled through capacitor 1020 for provision to the antenna input of the vehicle radio 175. A further load resistor 1025 having a high resistance value may be placed across the antenna input terminals to the vehicle radio 175. In the circuit of FIG. 10, RF signals from antenna 185 also may be directly coupled to the antenna input of the vehicle radio through resistor 1030.

The various resistance and capacitance values employed in the circuit of FIG. 10 may be chosen to ensure proper reception of RF signals from both antenna 185 and FM modulator 165 while concurrently limiting retransmission of the FM modulator signals. Exemplary values for the electronic components are set forth in Table 2.

TABLE 2

| Component Reference | Component Value |
|---|---|
| 1003 | 100 pF |
| 1005 | 75 ohms |
| 1010 | 1:4 ratio transformer |
| 1015 | 1K ohms |
| 1017 | 500 ohms |
| 1020 | 22 pF |
| 1025 | 100K ohms |
| 1030 | 3.8K ohms |

Figure 11:
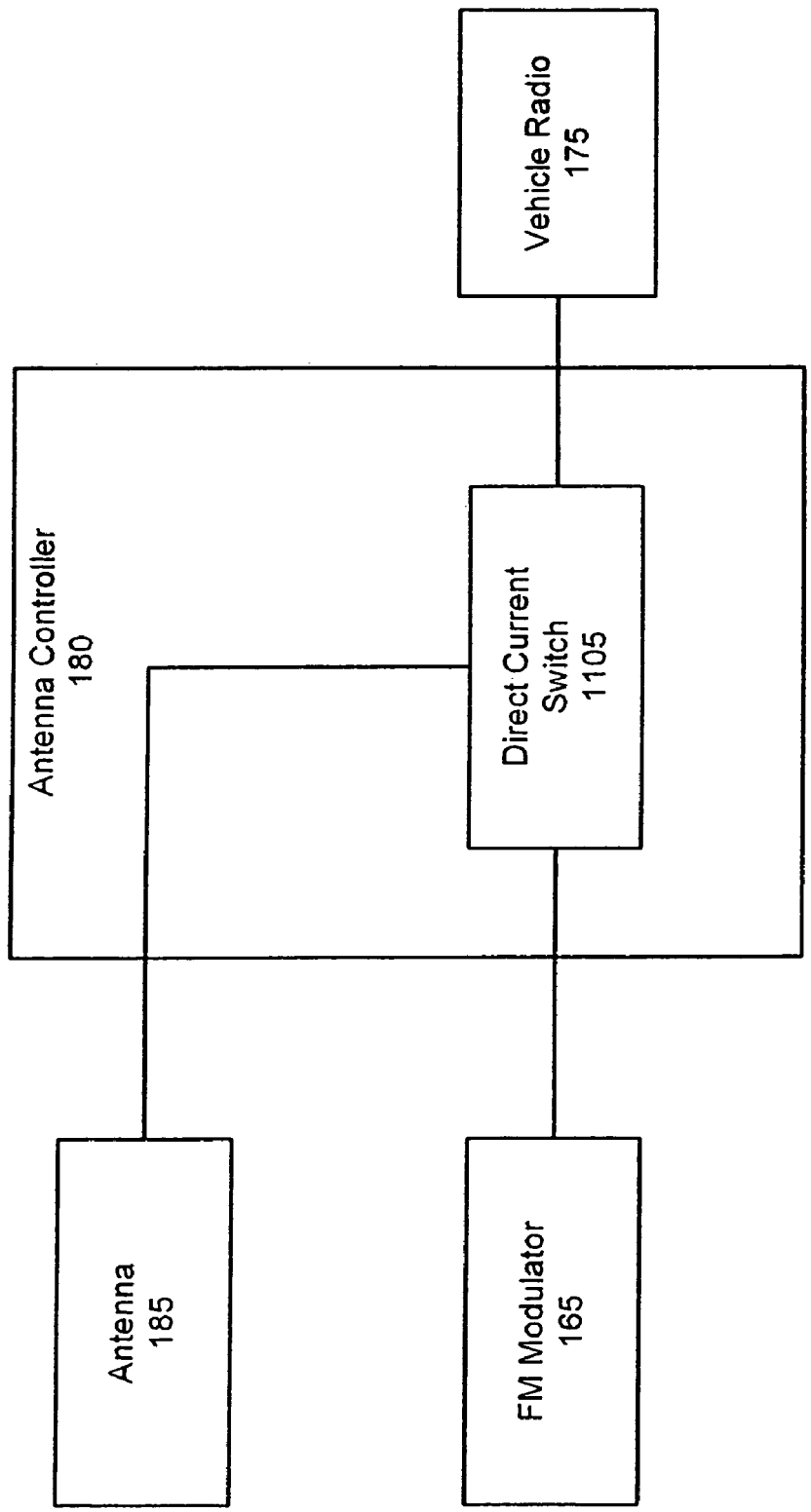
FIG. 11 is a block diagram of a still further construction of the antenna controller shown in FIG. 1.
Figure 12:
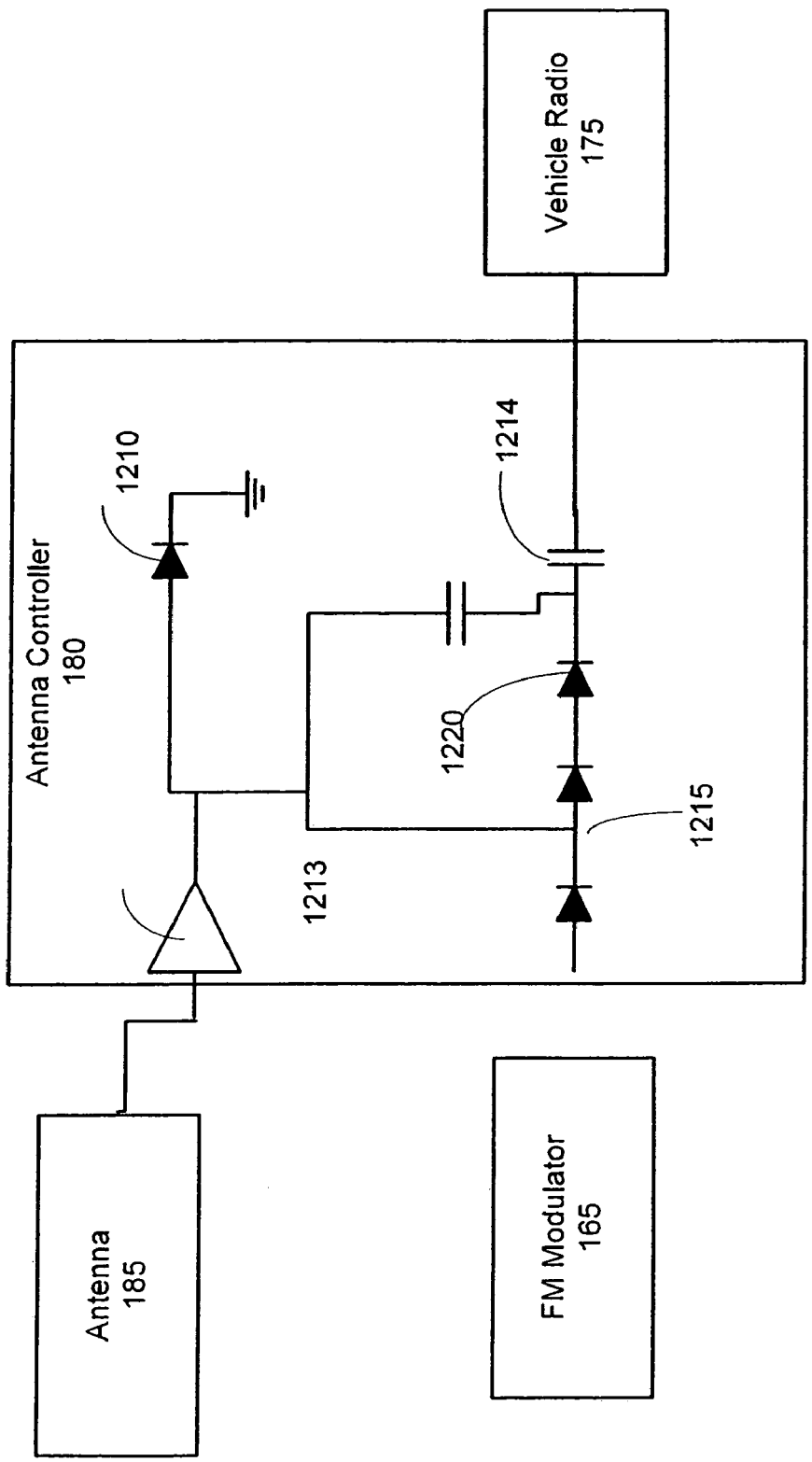
FIG. 12 is a diagram showing an example antenna, antenna controller, FM modulator, and vehicle radio.

Still another example of an antenna controller 180 is shown in FIG. 11. In this example, antenna controller 180 may act as an RF antenna switch that switches the antenna input of the vehicle radio 175 between the antenna 185 and FM modulator 165. To this end, antenna controller 180 may include a direct current switch 1105. The direct current switch 1105 may be responsive to a DC offset signal that is superimposed on the signal from FM modulator 165 to execute the switching operation. In operation, the direct current switch 1105 response to the presence or absence of a DC offset signal on the output of FM modulator 165 to connect either the signal from antenna 185 or the signal from FM modulator 165 to the antenna input of the vehicle radio 175. For example, a DC offset signal may be provided on the output signal from FM modulator 165 when the signal from FM modulator 165 is to be provided to the vehicle radio 175. In such instances, direct current switch 1105 may respond to the presence of the DC offset by effectively connecting FM modulator 165 to vehicle radio 175 while concurrently disconnecting antenna 185 from vehicle radio 175. In the absence of a DC offset signal, direct current switch 1105 may respond by effectively connecting antenna 185 to vehicle radio 175 while concurrently disconnecting FM modulator 165 from vehicle radio 175.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle media system for use in conjunction with a portable media device having a user interface comprising a portable media device potentiometer, a plurality of portable media device buttons in a given formation, and a display that provides a plurality of screens to facilitate user interaction with the portable media device, the vehicle media system comprising:
    an input module mountable at a first location within a vehicle cabin for manipulation by a user pursuant to input of system commands, where the first location is on a console disposed between a driver's seat and a front passenger seat of the vehicle cabin;
    a display module mountable at a second location within the vehicle cabin, where the second location is different from the first location, and where the second location is on a dashboard of the vehicle cabin;
    a main module cooperating with the display module and the input module to facilitate user interaction with the portable media device, where the main module cooperates with the input module and the display module to provide a secondary user interface for the portable media device when the portable media device is coupled to the vehicle media system, and where the secondary user interface substantially imitates the user interface of the portable media device;
    where the main module further comprises audio circuitry receiving signals corresponding to stored audio content of the portable media device through a media device interface:
    where the input module comprises:
        a substantially circular housing that has a face portion and a rear portion;
        a mounting stem extending from the rear portion of the substantially circular housing;
        an input module potentiometer control disposed in the substantially circular housing; and
        a plurality of input module buttons disposed radially about a first axis of the substantially circular housing; and
    where the input module potentiometer control is disposed for rotational manipulation about a second axis of the substantially circular housing.

2. The system of claim 1, where the main module comprises:
    an input interface disposed to receive signals indicative of manipulation of the input module by the user;
    a display interface disposed to provide signals to operate the display module; and
    the media device interface, the media device interface disposed to communicate with the portable media device.

3. The system of claim 1, where the signals received by the audio circuitry from the media device interface are analog signals.

4. The system of claim 1, where the signals received by the audio circuitry from the media device interface are digital signals.

5. The system of claim 1, where the audio circuitry comprises:
    an FM modulator converting the signals received by the audio circuitry to a format for reception by an FM radio; and
    baseband output circuitry converting the signals received by the audio circuitry to a format for provision to a vehicle head unit.

6. The system of claim 1, where the audio circuitry comprises:
    an FM modulator converting the signals received by the audio circuitry to a format for reception by an FM radio; and
    an antenna switch receiving modulated RF signals from the FM modulator and a vehicle antenna, where the antenna switch operates to selectively connect either the FM modulator or the vehicle antenna to an output of the antenna switch.

7. The system of claim 6, where the antenna switch operates to selectively connect either the FM modulator or 'the vehicle antenna based on a level of a DC offset signal provided on the modulated RF signal from the FM modulator to the antenna switch.

8. The system of claim 1, where the first and second axes are coaxial with one another.

9. The system of claim 1, where the display module comprises:
    an electronic display;
    a housing disposed about the electronic display, where the housing has an open bezel portion for viewing the electronic display; and
    where the mounting stem extends from the housing.

10. The system of claim 1, where the main module comprises a housing substantially enclosing electronic components of the main module, where the housing is mountable at a third location in the vehicle cabin that is separate from the first and second locations.

11. The system of claim 1, further comprising a recharge controller disposed to charge the portable media device using a power input from a vehicle power source when a voltage level of the power input is less than a maximum threshold voltage level and to inhibit charging of the portable media device using the power input when the voltage level of the power input is greater than the maximum threshold voltage level.

12. A vehicle media system for use in connection with a portable media device comprising:
    an input module mounted at a console disposed between a driver's seat and a passenger seat within a vehicle cabin for manipulation by a user pursuant to input of system commands;
    a display module mounted at a dashboard within the vehicle cabin;

a main module cooperating with the display module and the input module to facilitate user interaction with the portable media device, where the main module cooperates with the input module and the display module to generally mimic a user interface of the portable media device when the portable media device is operated in conjunction with the vehicle media system, the main module comprising audio circuitry receiving signals corresponding to stored audio content of the portable media device;

where the input module comprises:
- a substantially circular housing that has a face portion and a rear portion;
- a mounting stem extending from the rear portion of the substantially circular housing;
- an input module potentiometer control disposed in the substantially circular housing; and
- a plurality of input module buttons disposed radially about a first axis of the substantially circular housing; and
- where the input module potentiometer control is disposed for rotational manipulation about a second axis of the substantially circular housing.

13. The system of claim 12, where the audio circuitry comprises:
- an FM modulator converting the signals received by the audio circuitry to a format for reception by an FM radio; and
- baseband output circuitry converting the signals received by the audio circuitry to a format for provision to a vehicle head unit.

14. The system of claim 12, where the audio circuitry comprises:
- an FM modulator converting the signals received by the audio circuitry to a format for reception by an FM radio; and
- an antenna switch receiving modulated RF signals from the FM modulator and a vehicle antenna, where the antenna switch operates to selectively connect either the FM modulator or the vehicle antenna to an output of the antenna switch.

15. The system of claim 14, where the antenna switch operates to selectively connect either the FM modulator or the vehicle antenna based on a level of a DC offset signal provided on the modulated RF signal from the FM modulator to the antenna switch.

16. The system of claim 12, further comprising:
- a power input from a power source in the vehicle;
- a recharge circuit disposed to receive power provided from the power Input, where the recharge circuit is further disposed to provide recharge power to the portable media device;
- a comparator circuit disposed to compare a voltage level of the power input with a minimum threshold voltage level and a maximum threshold voltage level; and
- a disconnection circuit disposed to inhibits charging of the portable media device by the recharge circuit if the voltage level of the power input is less than the minimum threshold voltage level and to inhibit charging of the portable media device by the recharging circuit if the voltage of the power input is greater than maximum threshold voltage level.

17. The system of claim 12, where the signals received by the audio circuitry are analog signals.

18. The system of claim 12, where the signals received by the audio circuitry are digital signals.

19. The system of claim 16, where the minimum threshold voltage level represents a voltage large enough for the power source to start the vehicle.

20. The system of claim 16, where the maximum threshold voltage level represents a voltage level that may damage the portable media device.

* * * * *